April 7, 1970           H. ZOLTOK           3,504,569

STEERING COLUMN ADJUSTING MEANS

Filed May 6, 1968           2 Sheets-Sheet 1

INVENTOR

HARRY ZOLTOK

BY

ATTORNEY

April 7, 1970            H. ZOLTOK            3,504,569

STEERING COLUMN ADJUSTING MEANS

Filed May 6, 1968            2 Sheets-Sheet 2

INVENTOR

HARRY ZOLTOK.

BY

ATTORNEY

United States Patent Office 3,504,569
Patented Apr. 7, 1970

3,504,569
STEERING COLUMN ADJUSTING MEANS
Harry Zoltok, Winnipeg, Manitoba, Canada, assignor to Motor Coach Industries Limited, Winnipeg, Manitoba, Canada
Filed May 6, 1968, Ser. No. 726,960
Int. Cl. B62d 1/18
U.S. Cl. 74—493                                    5 Claims

ABSTRACT OF THE DISCLOSURE

An air operated piston and cylinder assembly locking a steering column in position by friction engaging segments on the column and on the support structure of the vehicle. The piston and cylinder assembly is also provided with an internal spring which maintains some clamping effect in the event that the air to the cylinder is lost.

---

This invention relates to new and useful improvements in steering column adjustment means, particularly steering column adjustment means for relatively heavy duty motor coaches, trucks and the like.

It is conventional to provide a steering column having an upper portion and a lower portion connected together by means of a universal joint and having means to permit a limited fore and aft adjustment of the upper portion which, of course, is secured to the steering wheel.

Conventional means normally incorporate manually operated clamps or the like which are unsatisfactory due to the difficulty in readily adjusting the position depending upon driving conditions.

Pneumatically operated devices have also been used, but these suffer from the disadvantage of becoming completely free if the air to the pneumatic piston and cylinder assembly is lost inadvertently and it will be appreciated that loss of air under these circumstances can be extremely dangerous to the operator.

The present device overcomes the disadvantages inherent in the above by providing a pneumatic piston and cylinder assembly which also incorporates a pressure spring which maintains a predetermined pressure on the clamping mechanism between the upper and lower portions so that if air is lost, there is still a considerable resistance to movement of the column thus making the device safe to use.

Another object of the device is to provide a device which heretofore described which is simple in construction, economical in manufacture, and otherwise well suited to the purpose for which it is designed.

With the foregoing considerations in view, and such other objects, purposes or advantages as may become apparent from consideration of this disclosure and specification, the present invention consists of the inventive concept which embraces or includes the method, process, construction, arrangement of parts, or new use of any of the foregoing, as herein particularly exemplified in one or more specific embodiments of such concept, reference being had to the accompanying figures in which.

In the drawings like characters of reference indicate corresponding parts in the different figures.

Figure 1:
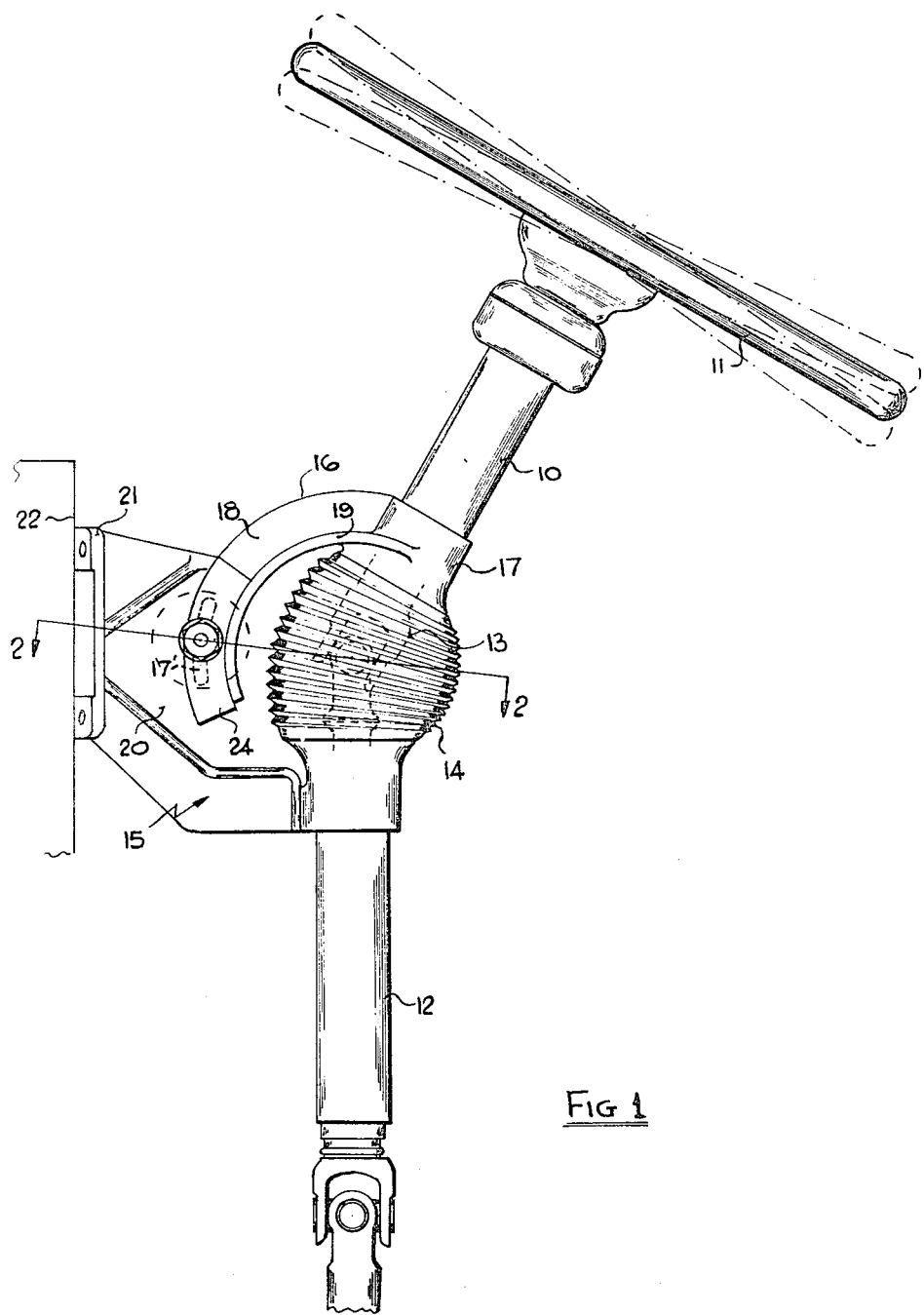
FIGURE 1 is a side elevation of a steering column assembly showing my invention incorporated therein.

Proceeding therefore to describe my invention in detail, reference to FIGURE 1 will show a steering column consisting of an upper portion 10 having a steering wheel 11 adhered thereto and a lower portion 12 which, of course, is connected to the steering mechanism of the motor coach or truck.

Universal joint 13 is shown in phantom in FIGURE 1 and connects the portions 10 and 12 together so that rotation of the steering wheel is transferred to rotation of the lower portion 12.

A flexible rubber or plastic dust cover 14 normally covers the universal joint 13 in the usual manner.

My device collectively designated 15 consists of an arcuately curved first segment 16 secured to a sleeve 17 surrounding the upper steering column portion 10, said upper portion 10 rotating within said sleeve 17. This first segment portion is provided with an elongated slot 17' within the web 18 thereof, and the web 18 is centrally located upon a horizontal flange 19, details of which are shown in FIGURE 2.

A second segment portion 20 extends from a securing plate 21 by which same may be secured to the front support structure 22 of the coach or truck and this second segment portion is of the same arcuate curve, but of a shorter length than the first portion 16. The inner end 23 (see FIGURE 2) rests against and runs on the aforementioned flange 19 of the first segment portion 16.

Figure 2:
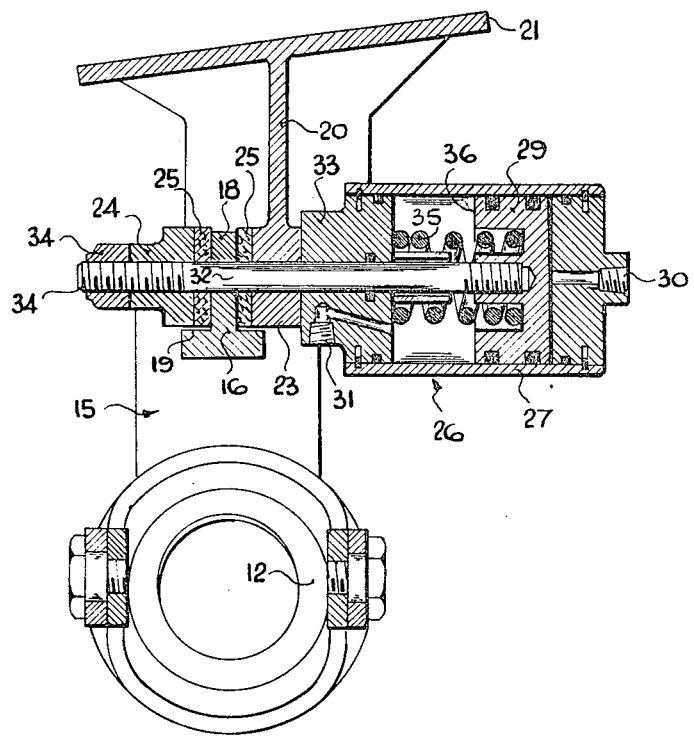
FIGURE 2 is a section substantially along the lines 2—2 of FIGURE 1.

This second segment portion 20 is spaced and parallel to the web 18 of the first segment portion 16 and a clamping portion 24 is situated upon the opposite side of the web and also rests against the flange 19 as clearly shown in FIGURE 2.

Friction plates 25 are situated upon each side of the web 18 and between the portions 20 and 24 and all of these portions are apertured in alignment with the elongated apertures 17' hereinbefore described.

In the accompanying claims, the combination of these portions has been referred to as brake means for controlling the frictional characteristics between the upper and lower columns 10 and 12.

Means collectively designated 26 are provided to release and secure the clutch assembly taking the form of a pneumatic piston and cylinder assembly 27. Reference character 28 illustrates the cylinder having piston 29 reciprocal therein and actuated pneumatically in the conventional manner, inlet 30 and outlet 31 being provided and connected to a source of pneumatic power (not illustrated).

A piston rod 32 is secured to piston 29 and extends through end cap 33. This piston rod is screw-threaded as at 34 upon the distal end thereof and this portion of the piston rod extends through the apertures in the segments 16 and 20 and also through the portion 24 and the friction plates 25 with nut 34' securing the assembly together as shown in FIGURE 2. However, it should be understood that this nut does not apply clamping action to the assembly but merely limits endwise movement thereof.

In operation, pneumatic pressure upon piston 29 on the underside, moves the piston rod 32 rightwardly with respect to the drawings thus clamping the assembly together and preventing relative movement between the upper column 10 and the lower column 12. Conversely, release of this pneumatic pressure will allow the limited adjustment of the steering column as shown in phantom in FIGURE 1, and limited by the length of the elongated slot 17'.

Figure 3:
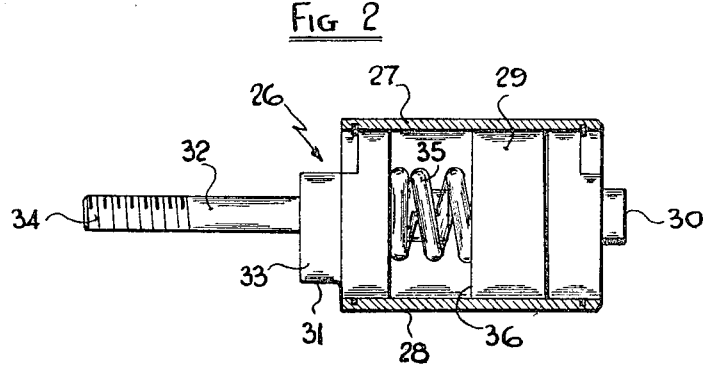
FIGURE 3 is a cross sectional view of the piston and cylinder assembly per se.

In order to prevent dangerous free movement occurring in the event that air is lost from the pneumatic system, I have provided a heavy duty compression spring 35 surrounding the piston rod 32 and within the cylinder 28. This spring reacts between the underside 36 of the piston 29 and the end cap 33 and normally maintains the piston at the right end of the cylinder with reference to FIGURE 3 thus applying a pre-determined clamping effect between the segments 16 and 20 in combination with the portion 24 and friction plates 25 so that even if the air is lost, there is a fair resistance of movement of the upper portion 10 thus preventing a dangerous condition from occurring.

Various modifications can be made within the scope of the inventive concept disclosed.

What I claim as my invention is:

1. In a steering column assembly including a steering wheel, an upper column portion secured to said wheel, a lower column portion and a universal joint connecting said portions together, and supporting structure forwardly of said column; adjustment means between said upper column portion and said lower column portions, said means including a friction brake assembly operatively connected between said support structure and said upper column portion, and means to apply positive frictional pressure to said assembly to inhibit said relative movement between said upper column portion and said lower column portion, said means to apply positive friction pressure including a pneumatic piston and cylinder assembly operatively connected to said brake assembly, said piston and cylinder assembly also including a spring reacting between said cylinder and said piston normally applying friction pressure to said brake assembly.

2. The device according to claim 1 in which said brake assembly includes a first segment portion secured by one end thereof to said upper column portion, a second segment portion secured to said supporting structure and situated in spaced and parallel relationship with respect to first segment portion, friction means between said first and second segment portions, and means to apply pressure between said first and second segment portion and said friction means.

3. The device according to claim 2 in which said first and second segments and said friction means are apertured, the aperture in one of said segment portions being elongated, said means to apply positive frictional pressure being operatively connected through said aperture.

4. In a steering column assembly including a steering wheel, an upper column portion secured to said steering wheel, a lower column portion and a universal joint connecting said portions together, and supporting structure forwardly of said column; adjustment means between said upper column portion and said lower column portion, said means including an arcuately curved segment portion extending from said upper column portion, said first segment portion having an elongated slot formed therein, a second segment portion secured to said supporting structure and being in spaced and parallel relationship with the first segment portion, a friction plate between said portions, said friction plate and said second segment portion being apertured, means to apply frictional pressure between said portions, said means comprising a pneumatic piston and cylinder assembly, the piston rod of said piston assembly running through said apertures and being secured through said apertures, the actuation of said piston and cylinder assembly releasing or increasing the frictional pressure between said first and second portions and said friction plate.

5. A device according to claim 4 which includes means to maintain a pre-determined pressure between said first and second portion and said friction plate, said means comprising a spring surrounding the piston rod of said piston and rod assembly and within said cylinder assembly, said spring reacting between one end of said cylinder and one side of said piston, said spring normally maintaining frictional pressure between said first and second segment portions.

References Cited
UNITED STATES PATENTS

| | | | |
|---|---|---|---|
| 1,520,677 | 12/1924 | Moyse | 74—493 |
| 2,830,464 | 4/1958 | Winterbauer. | |
| 3,144,785 | 8/1964 | Steiner et al. | 74—493 |
| 3,195,692 | 7/1965 | Herr et al. | 188—170 |

MILTON KAUFMAN, Primary Examiner

U.S. Cl. X.R.

74—531; 188—170